US012101183B2

(12) United States Patent
Su et al.

(10) Patent No.: US 12,101,183 B2
(45) Date of Patent: Sep. 24, 2024

(54) ENHANCED NEGATIVE ACKNOWLEDGMENT CONTROL FRAME

(71) Applicant: Micron Technology, Inc., Boise, ID (US)

(72) Inventors: Zhanqiang Su, Shanghai (CN); Junjun Wang, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 82 days.

(21) Appl. No.: 17/815,912

(22) Filed: Jul. 28, 2022

(65) Prior Publication Data

US 2024/0039656 A1    Feb. 1, 2024

(51) Int. Cl.
*H04L 1/00*      (2006.01)
*H04L 1/1812*    (2023.01)
*H04L 1/20*      (2006.01)

(52) U.S. Cl.
CPC .......... *H04L 1/0061* (2013.01); *H04L 1/1819* (2013.01); *H04L 1/203* (2013.01)

(58) Field of Classification Search
CPC .. G06F 11/0772; G06F 3/0659; G06F 3/0653; G06F 3/0679; H04L 1/0061; H04L 1/1819; H04L 1/203
See application file for complete search history.

(56) References Cited

U.S. PATENT DOCUMENTS

| | | | | |
|---|---|---|---|---|
| 11,687,420 B2* | 6/2023 | Lin | ...................... | G06F 11/0772 |
| | | | | 714/5.11 |
| 11,740,834 B2* | 8/2023 | Choi | ...................... | G06F 3/0659 |
| | | | | 711/103 |
| 2016/0170824 A1* | 6/2016 | Hamo | ................... | H04L 1/1671 |
| | | | | 714/763 |

* cited by examiner

*Primary Examiner* — Shelly A Chase
(74) *Attorney, Agent, or Firm* — Holland & Hart LLP

(57) ABSTRACT

Methods, systems, and devices for enhanced negative acknowledgment control (NAC) frame are described. A device may generate and communicate an enhanced NAC frame that includes additional error information to indicate to the device a cause for the error. The device may receive a data frame and determine an error condition associated with a set of layers of a protocol stack. The device may generate feedback indicating a cause for the determined error condition and transmit the feedback indicating the error cause. The feedback may be a NAC that includes a first quantity of bits configured for indicating an existence of an error and a second quantity of bits configured for indicating the error cause. A format of the NAC frame may include bits configured to identify multiple types of error causes associated with the different layers of the protocol stack.

25 Claims, 8 Drawing Sheets

ENHANCED NEGATIVE ACKNOWLEDGMENT CONTROL FRAME

FIELD OF TECHNOLOGY

The following relates to one or more systems for memory, including enhanced negative acknowledgment control frame.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Some devices may perform various operations associated with retransmission and frame acknowledgment. For example, a peer device (e.g., a memory device or a host device) with feedback enabled may transmit a frame (e.g., a data frame or a control frame) to a local device (e.g., a memory device or a host device) and buffer the unacknowledged frame in a logical buffer until receiving feedback associated with the transmitted frame. In some cases, the peer device may receive an acknowledgment control frame (AFC) to indicate that the transmitted frame was successfully received, or a negative acknowledgment control (NAC) to indicate that some error occurred (e.g., used for signaling errors and triggering retransmission). However, the NAC frame format may provide insufficient error information to identify some types of errors that may occur. Due to the partial error information, the various operations associated with retransmission and frame acknowledgment may experience relatively high latency, inefficient utilization of resources (e.g., time and power), and an inability to determine (e.g., debug) the error.

The techniques described herein enable a device to communicate a NAC frame that includes additional error information to indicate to the device a cause for the error, which may result in a quicker (e.g., lower latency) diagnosis and recovery process. For example, a local device may receive a frame including header information (e.g., a frame sequency number, traffic class, etc.) and a data payload. The local device may determine an error condition associated with a set of layers of a protocol stack (e.g., a protocol stack associated with a unified protocol (UniPro) specification). The local device may generate feedback (e.g., a control frame) indicating a cause (e.g., an error cause) for the determined error condition and transmit the feedback indicating the error cause. In some cases, the feedback may be a NAC that includes a first quantity of bits configured for indicating an existence of an error (e.g., whether there is an error) and a second quantity of bits configured for indicating the error cause. The error cause may be associated with a first layer, a second layer, or a third layer of the protocol stack. In some implementations, the NAC may indicate one or more error causes. As such, a format of the NAC frame may include bits configured to identify multiple types of error causes associated with the different layers of the protocol stack.

Figure 1:
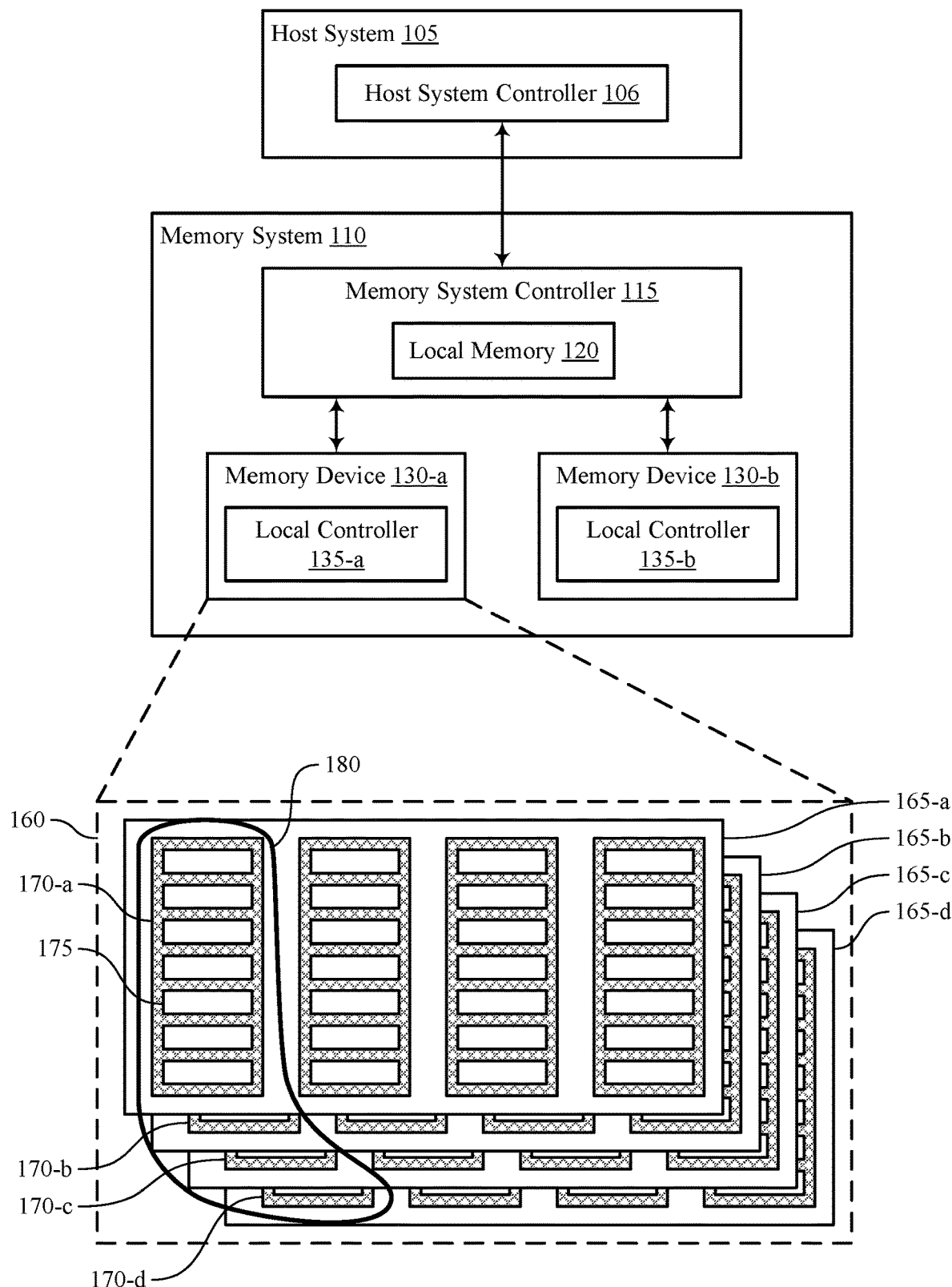
FIG. 1 illustrates an example of a system that supports an enhanced negative acknowledgment control (NAC) frame in accordance with examples as disclosed herein.
Figure 2:
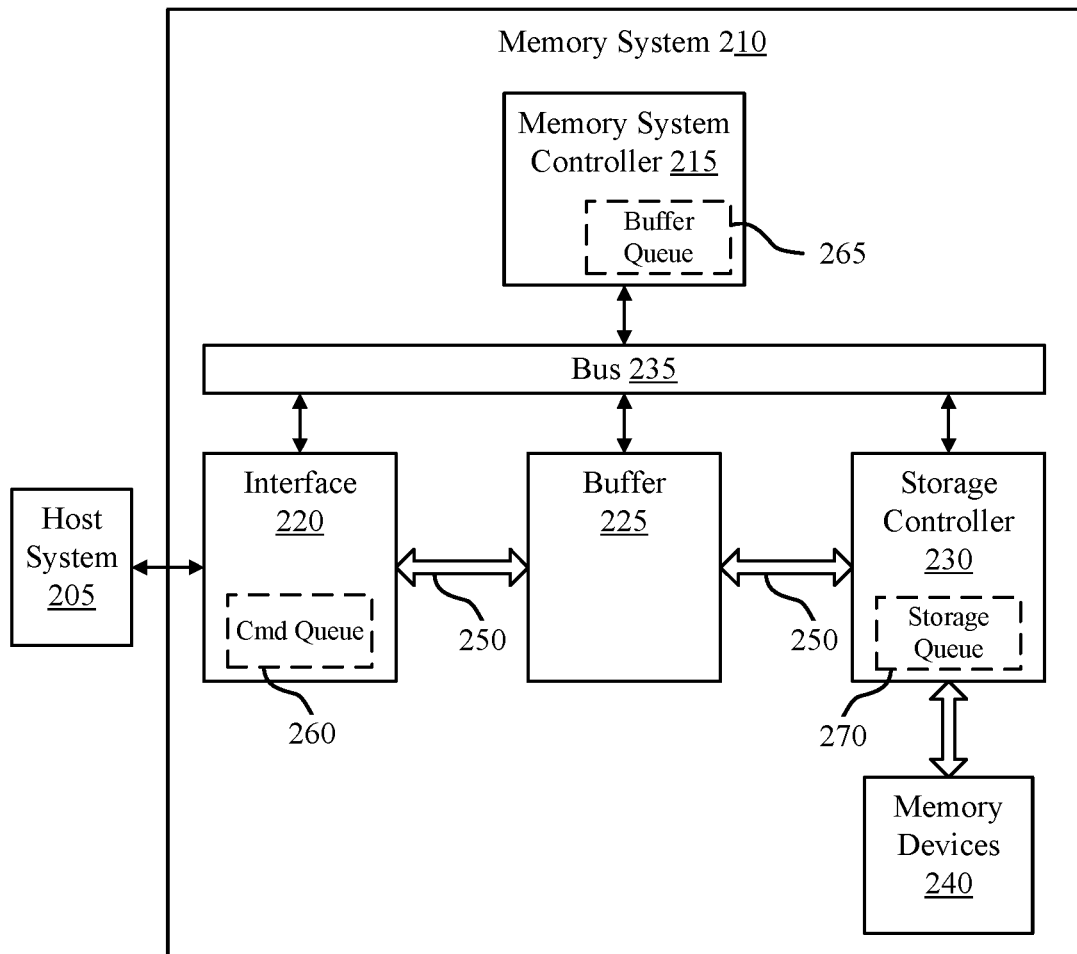
FIG. 2 illustrates an example of a system that supports an enhanced NAC frame in accordance with examples as disclosed herein.
Figure 3:
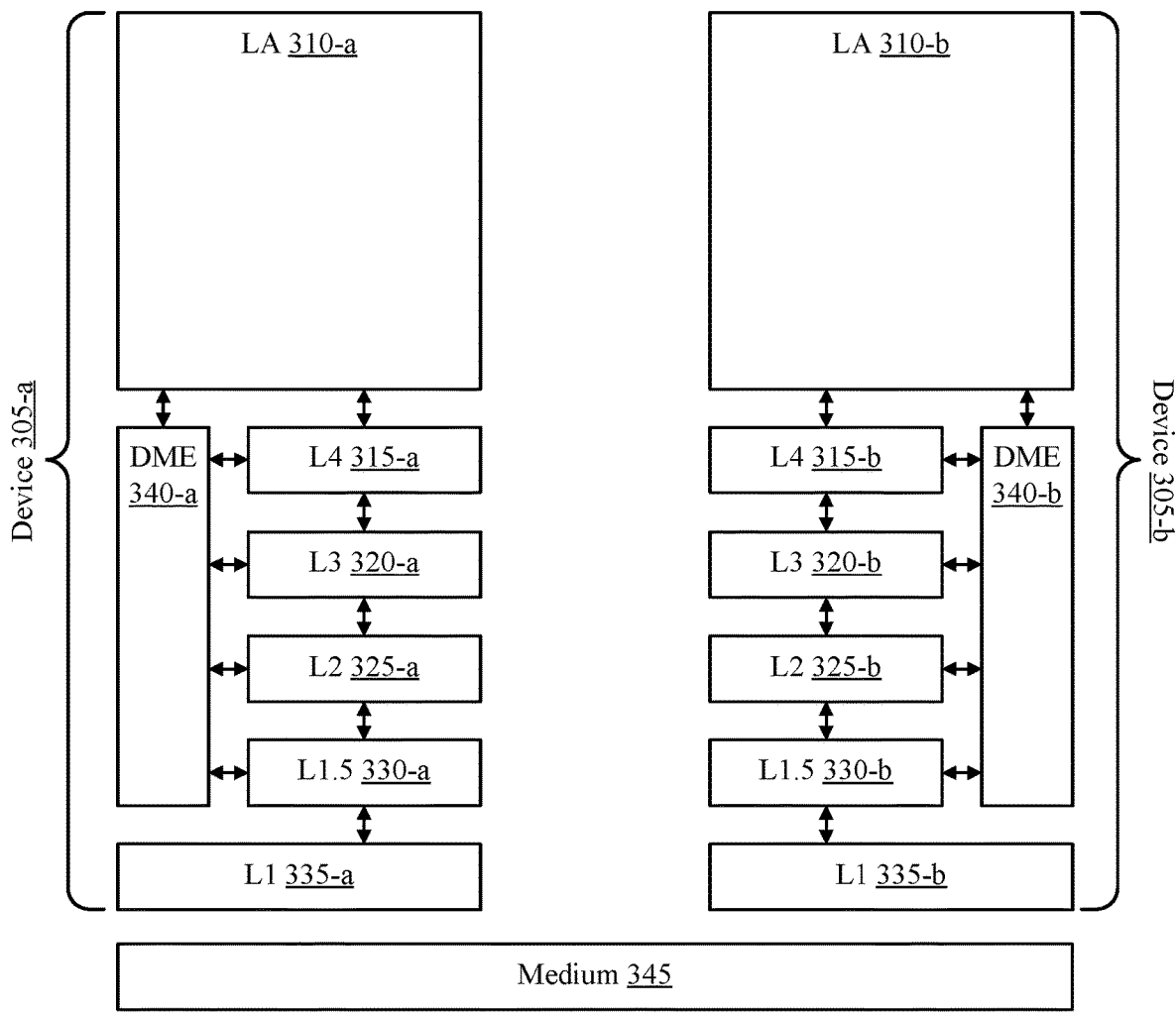
FIG. 3 illustrates an example of a system that supports an enhanced NAC frame in accordance with examples as disclosed herein.

Features of the disclosure are initially described in the context of systems, devices, and circuits with reference to FIGS. 1 through 3. Features of the disclosure are described in the context of a frame with reference to FIG. 4. These and other features of the disclosure are further illustrated by and described in the context of apparatus diagrams and flowcharts that relate to an enhanced NAC frame with reference to FIGS. 5 through 8.

FIG. 1 illustrates an example of a system 100 that supports an enhanced NAC frame in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMN interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MHLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165-*c*, 165-*d*, respectively, and blocks 170-*a*, 170-*b*, 170-*c*, and 170-*d* may be collectively referred to as a virtual block 180.

In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may include any quantity of non-transitory computer readable media that support enhanced NAC frames. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

Some systems 100 may perform various operations associated with retransmission and frame acknowledgment using AFC and NAC frames (e.g., control frames (e.g., data associated with flow control and handling transmission errors that may exclude application data)). For example, a peer device (e.g., a memory system 110 or a host system 105) with feedback enabled may transmit (e.g., using serial link high-speed communication) a data frame (e.g., packaged application data that may include a header, a payload, and a trailer) to a local device and buffer the unacknowledged frame in a logical buffer until receiving an AFC or a NAC frame associated with (e.g., including an identical frame sequence number) the unacknowledged frame. However, the NAC frame format provides insufficient error information to correctly identify the type of error that has occurred. Due to the limited error information, the various operations associated with retransmission and frame acknowledgment may experience relatively high latency, inefficient utilization of resources (e.g., time and power), and an inability to determine (e.g., debug) the error.

The techniques described herein enable a device to communicate an enhanced NAC frame that includes additional error information to indicate to the device a cause for the error (e.g., error cause), which may result in a quicker (e.g., lower latency) diagnosis and recovery process. For example, a local device (e.g., a memory system 110 or a host system 105) may receive a frame including header information (e.g., a frame sequency number, traffic class, etc.) and a data payload. The local device may determine an error condition (e.g., an error has occurred) associated with a set of layers of a protocol stack (e.g., a protocol stack associated with the UniPro specification). The local device may generate feedback (e.g., a control frame) indicating a cause (e.g., an error cause) for the determined error condition and transmit the feedback indicating the error cause. In some cases, the feedback may be a NAC that includes a first quantity of bits configured for indicating an existence of an error (e.g., error bits) and a second quantity of bits configured for indicating the error cause. The error cause may be associated with a first layer, a second layer, or a third layer of the protocol stack. In some implementations, the NAC may indicate one or more error causes. As such, a format of the NAC frame may include bits configured to identify multiple types of error causes associated with the different layers of the protocol stack.

The techniques may include communications between a local device and a peer device. A local device (e.g., a memory system 110 or a host system 105) may refer to a device that receives a data frame and transmits the AFC or NAC frame in response to receiving that data frame. The peer device (e.g., a memory system 110 or a host system 105) may refer to a device that transmits a data frame and then receives the AFC or NAC frame in response to transmitting that data frame. As such, the techniques described herein may be interchangeably performed by either the host system 105 or the memory system 110 because the local device may refer to either the host system 105 or the memory system 110 and the peer device may refer to either the host system 105 or the memory system 110.

FIG. 2 illustrates an example of a system 200 that supports an enhanced NAC frame in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, for example, in response to receiving access commands from the host system 205, as described herein. The memory devices 240 may include one or more memory devices as described with reference to FIG. 1. For example, the memory devices 240 may include NAND memory, PCM, self-selecting memory, 3D cross point or other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, for example, for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, for example, a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, for example, as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, for example, if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, such as, according to a protocol (e.g., a UFS protocol or an eMMC protocol). Thus, the interface 220 may be considered a front end of the memory system 210. Upon receipt of each access command, the interface 220 may communicate the command to the memory system controller 215, for example, via the bus 235. In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved therefrom, for example, by the memory system controller 215. In some cases, the memory system controller 215 may cause the interface 220, for example, via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, for example, via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), such as according to a protocol (e.g., a UFS protocol or an eMNC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, for example, via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, for example, via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, such as by the memory system controller 215. The entries may be removed from the storage queue 270, such as by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, such as via firmware (e.g., controller firmware), an amount of space within the buffer 225 that may be available to store data associated with the read command.

In some cases, the buffer queue 265 may be used to aid with buffer storage of data associated with read commands in a similar manner as discussed with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, for example, via the bus 235, in response to the data transfer to the buffer 225 being completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, for example, according to a protocol (e.g., a UFS protocol or an eMC protocol). For example, the interface 220 may process the command from the command queue 260 and may indicate to the memory system controller 215, for example, via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed herein. As the data is moved into and stored within the buffer 225, the command may remain in the buffer queue 265. A command may be removed from the buffer queue 265, for example, by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the described operations in conjunction with or instead of the memory system controller 215. In some cases, the memory system controller 215 may perform the functions of the storage controller 230 and the storage controller 230 may be omitted.

Some systems 200 may perform various operations associated with retransmission and frame acknowledgment using AFC and NAC frames. For example, a peer device (e.g., a memory system 210 or a host system 205) with feedback enabled may transmit (e.g., using serial link high-speed communication) a data frame to a local device and buffer the unacknowledged frame in a logical buffer until receiving an AFC or a NAC frame associated with (e.g., including an identical frame sequence number) the unacknowledged frame. However, the NAC frame format may provide insufficient error information to identify some types of errors that may occur. Due to the limited error information, the various operations associated with retransmission and frame acknowledgment may experience relatively high latency, inefficient utilization of resources (e.g., time and power), and an inability to determine (e.g., debug) the error.

The techniques described herein enable a device (e.g., a memory system 210 or a host system 205) to communicate an enhanced NAC frame that includes additional error information to indicate to the device a cause for the error, which may help a peer device determine what error happened by recording the additional information (e.g., the peer side may recover the former error status more quickly and may help debugging the error). For example, a local device (e.g., a memory system 210 or a host system 205) may receive a frame including header information (e.g., a frame sequency number, traffic class, etc.) and a data payload. The local device may determine an error condition associated with a set of layers of a protocol stack (e.g., a protocol stack associated with the UniPro specification). The local device may generate feedback (e.g., a control frame) indicating a cause (e.g., an error cause) for the determined error condition and transmit the feedback indicating the error cause. In some cases, the feedback may be a NAC that includes a first quantity of bits configured for indicating an existence of an error (e.g., whether there is an error) and a second quantity of bits configured for indicating the error cause. The error cause may be associated with a first layer, a second layer, or a third layer of the protocol stack. In some implementations, the NAC may indicate one or more error causes. As such, a format of the NAC frame may include bits configured to identify multiple types of error causes associated with the different layers of the protocol stack.

FIG. 3 illustrates an example of a system 300 that supports an enhanced NAC frame in accordance with examples as disclosed herein. The system 300 may be an example of or implement aspects of a system 100 or a system 200 as described herein with reference to FIG. 1 and FIG. 2 respectively. For example, a device 305-a and a device 305-b (e.g., a peer device and/or a local device) may be examples of the memory system 110, the memory system 210, the host system 105, and the host system 205. In some cases, the device 305-a or the device 305-b may be an example of a UFS device.

In some examples, the devices 305 may implement the UniPro specification from the MIPI Alliance Specifications. The UniPro specification may be applicable to various device types (application processors, coprocessors, modems, displays, camera sensors, etc.) and data traffics (e.g., control messages, bulk data transfer, and packetized streaming), and may be a single specification associated with a family of specifications (e.g., the MIPI Alliance Specifications). The UniPro specification may particularly define the protocol used to transfer data between devices (e.g., the devices 305) that implement the UniPro specification (e.g., definitions of data structures, flow control, error handling, etc.).

In some cases, the system 300 may represent a simplified model of a single link (e.g., a UniPro link (e.g., a bidirectional interconnection between two devices or switches)) connecting the device 305-a and the device 305-b. In some examples, the link may include one or more lanes (e.g., unidirectional differential data or clock line pairs). The devices 305 may include an application layer (LA) (e.g., LA 310-a and LA 310-b), a device management entity (DME) (e.g., DME 340-a and DME 340-b), and a protocol stack (e.g., multiple layers) associated with the UniPro specification, including a first layer (e.g., L1 335-a and L1 335-b), a second layer (e.g., L1.5 330-a and L1.5 330-b), a third layer (e.g., L2 325-a and L2 325-b), a fourth layer (e.g., L3 320-a and L3 320-b), and a fifth layer (e.g., L4 315-a and L4 315-b), which pass data via various service access points (SAPs). For example, if the device 305-a transmits data from LA 310-a to the device 305-b, the device 305-a may pass the data from LA 310-a, to L4 315-a, to L3 320-a, to L2 325-a, to L1.5 330-a, and to L1 335-a via various SAPs. The device 305-a may then communicate the data to L1 335-b of the device 305-b via medium 345 (e.g., wiring). The device 305-b may then pass the data up the protocol stack in reverse order (e.g., from L1 335-b to LA 310-b).

In some examples, according to the UniPro specification, the first layer may be a physical layer (L1), the second layer may be a physical adapter layer (L1.5), the third layer may be a data link layer (L2), the fourth layer may be a network layer (L3), and the fifth layer may be a transport layer (L4). Each layer may have a distinct format and process for packaging data and passing the data to the next layer. For example, each layer may include a distinct header and trailer with different formats to package the data as it is passed through the protocol stack. Data packaged at the various layers may include associated nomenclature to differentiate the formats (e.g., L4 data are segments, L3 data are packets, L2 data are frames, L1.5 data are symbols, and L1 data are physical encoded symbols).

In some cases, the device 305-a may transmit data (e.g., a data frame including header information and a data payload) to the device 305-b. The device 305-a may buffer the data frame as an unacknowledged frame until the device 305-a receives feedback from the device 305-b. The device 305-b may transmit an AFC or an NAC with header information that corresponds to the header information of the unacknowledged frame. If some error occurred (e.g., an incorrect payload length, a buffer overflow, an incorrect sequence number, etc.) during the communication process associated with the transmitted data, the device 305-b may transmit the NAC to indicate an error has occurred. However, the NAC does not provide error information indicating which error condition has occurred. As such, the device 305-a may not correctly identify the error condition (e.g., the type of error that has occurred), which may result in high latency and an inability to perform efficient corrective or recovery operations. In accordance with the techniques described herein, the system 300 may support an enhanced NAC frame with additional error information that may help identify the error conditions, which may result in reduced latency and more efficient recovery operations.

In some implementations, the device 305-a may transmit data. For example, the device 305-a may transmit the data (e.g., data packaged by each layer of the protocol stack) to the device 305-b via the medium 345. In some cases, the data may be associated with a frame sequence number (e.g., frame identification) and a traffic class (TC0 or TC1). The traffic class may indicate a priority level associated with the data, where frames of a higher priority (e.g., a higher traffic class) may preempt lower priority frames. Based on the frame sequence number, the device 305-a may buffer the data frame until the device 305-a receives a control frame (e.g., an AFC or an NAC) with a similar frame sequency number.

In some cases, the device 305-b may receive the data and pass the data up the protocol stack. In some examples, at L2 325-b, the device 305-b may determine the data frame including header information and a data payload associated with the received data (e.g., based on a data frame format).

In some examples, the device 305-b may determine an error condition associated with a set of layers of a protocol stack based on the data payload. For example, while passing the data up the protocol stack, an error may occur at L1 335-b. The device 305-b may detect the error condition and identify a cause for the error. Additionally, or alternatively, the device 305-b may detect multiple error conditions across multiple layers, or singular errors at different layers (e.g., L1.5 330-b or L2 325-b). For example, the error cause may correspond to an error associated with an AFC, filler data, a threshold duration, a frame number, an adapter initialization, an unsupported symbol, an unexpected frame sequency, frame syntax, a sequence number, a threshold frame length, a buffer overflow, a cyclic redundancy check, one or more timers, a frame reception, decoding data, a power mode change request, a power mode change confirmation, an attribute request, an attribute return, setting an attribute, returning an attribute setting result, one or more lanes, one or more lines, one or more symbols, or any combination thereof, as described herein with reference to FIG. 4.

In some cases, the device 305-b may generate feedback (e.g., AFC or NAC control frames) based on a control frame format. For example, the feedback may be an enhanced NAC that indicates the error cause for the determined error condition. The NAC format may include a first quantity of bits for indicating that an error has occurred (e.g., an error exists) and a second quantity of bits for indicating the error cause associated with the error condition, as described herein with reference to FIG. 4. In some examples, the device 305-b may generate the NAC frame at the L2 325-b.

In some examples, the device 305-b may transmit the generated control frame (e.g., feedback). For example, the device 305-b may pass the generated control frame down the protocol stack (e.g., from L2 325-b to L1.5 330-b to L1 335-b) and transmit the packaged control frame to the device 305-*a* via the medium 345. The device 305-*a* may receive the control frame indicating the error cause and perform recovery operations. In some cases, the recovery operation may include the device 305-*a* transmitting a retransmission of the data (e.g., a same data payload with a same or different sequence number). The device 305-*b* may receive and process the retransmission by passing the retransmission up the protocol stack and generating feedback (e.g., AFC or NAC) associated with the retransmission.

While described primarily with reference to the device 305-*a* transmitting data to the device 305-*b* and the device 305-*b* generating the feedback (e.g., the NAC), the described examples may also relate to the device 305-*a* transmitting the data and the NAC, the device 305-*a* receiving the data and generating the NAC, or any sequence of events that include a device 305 transmitting, receiving, or generating an enhanced NAC frame. For example, the device 305-*a* may transmit the data and initiate a timer (e.g., a counter) associated with the sequence number of the data. If the device 305-*a* fails to receive or process feedback from the device 305-*b* associated with the sequence number before expiration of the timer (e.g., before the timer reaches a threshold value), then the device 305-*a* may transmit a NAC frame associated with the transmitted data.

Figure 4:
FIG. 4 illustrates an example of a frame that supports an enhanced NAC frame in accordance with examples as disclosed herein.

FIG. 4 illustrates an example of a frame 400 that supports an enhanced NAC frame in accordance with examples as disclosed herein. The frame 400 may be an example of or implement aspects of a system 100, a system 200, or a system 300 as described herein with reference to FIGS. 1 through 3 respectively. For example, a NAC frame 405 may be examples of a NAC control frame generated by the memory system 110, the memory system 210, the host system 105, the host system 205, the device 305-*a*, or the device 305-*b*. In some cases, the NAC frame 405 may be an enhanced NAC control frame with additional error information bits.

A device may generate the NAC frame 405 to indicate an error condition and an error cause associated with a data frame. The NAC frame 405 may include multiple rows (e.g., six rows) and data fields corresponding to an enhanced NAC frame format. For example, the NAC frame 405 may include seventeen bits per row and one hundred and two total bits. The NAC frame 405 may be a single bitmap, a multi-bitmap, or both. In some implementations, a logic one may indicate an error detection and a logic zero may indicate a lack of error detection. In some cases, the data fields 435 may be reserved bit fields.

In some implementations, the first row 410-*a* and the last row 410-*b* may correspond to an unenhanced NAC frame. For example, the data fields 490-*a*, 490-*b*, and 490-*c* may correspond to a first row of an unenhanced NAC frame and the data field 495 may correspond to a second row of an unenhanced NAC frame.

The second row 415 may be associated with a first layer of a protocol stack. For example, the first layer may be a physical layer corresponding to L1 335, as described herein with reference to FIG. 3. The third row 420 may be associated with a second layer of the protocol stack. For example, the second layer may be a physical adapter layer corresponding to L1.5 330, as described herein with reference to FIG. 3. The fourth row 425-*a* and the fifth row 425-*b* may be associated with a third layer of a protocol stack. For example, the third layer may be a data link layer corresponding to L2 325, as described herein with reference to FIG. 3.

In some cases, the data field 430-*a*, data field 430-*b*, and data field 430-*c* may indicate error detection. For example, if the device receives data at the first layer and detects an error condition, the device may indicate that an error occurred at the first layer via the data field 430-*a* (e.g., placing a logic one at the thirty-sixth bit position). If the device receives data at the third layer and detects an error condition, the device may indicate that an error occurred at the third layer via the data field 430-*c*.

In some examples, the second row 415 may include data fields 440, 445, and 450, that indicate various error causes. For example, the data field 440 may indicate a line reset error, the data field 445 may indicate a symbol error, and the data field 450 may indicate an error associated with a lane (e.g., an error occurring on a first lane may be a line reset error, a symbol error, or another error associated with the first lane). The data field 440-*a* (Lane3 LineRst), data field 440-*b* (Lane2 LineRst), data field 440-*c* (Lane1 LineRst), data field 440-*d* (Lane0 LineRst), data field 445-*a* (Lane3 Symbol error), data field 445-*b* (Lane2 Symbol error), data field 445-*c* (Lane1 Symbol error), data field 445-*d* (Lane0 Symbol error), data field 450-*a* (Lane3 err), data field 450-*b* (Lane2 err), data field 450-*c* (Lane1 err), and data field 450-*d* (Lane0 err) may indicate a lane (e.g., lanes zero, one, two, or three) where the respective error occurred. For example, a device may receive a data frame and detect an error during line transmitting (e.g., a 3*b*4*b* Error, a 5*b*6*b* Error, or an RD_Error). The device may determine that a 5*b*6*b* Error occurred at a second lane and may generate the NAC frame 405 with the data field 450-*c* and data field 445-*c* set to a logic one to indicate that a symbol error occurred on lane one.

In some cases, the third row 420 may include data fields 455 and 460, that indicate various error causes. For example, the data field 455 (Unable decode err) may indicate that the device was unable to decode the data, the data field 460-*a* may indicate a return result of setting the value of an attribute (PACP_SET_cnf) error, the data field 460-*b* may indicate a set the value of an attribute (PACP_SET_req) error, the data field 460-*c* may indicate a return the value of an attribute (PACP_GET_cnf) error, the data field 460-*d* may indicate a request the value of an attribute (PACP_GET_req) error, the data field 460-*e* may indicate a power mode change confirmation (PACP_PWR_cnf) error, and the data field 460-*f* may indicate a power mode change request (PACP_PWR_req) error. In some cases, an attribute may be an atomic unit of information that may be read or written from an application using primitives (e.g., DME_GET or DME_SET). Attributes may be used to configure behavior, determine a current state, or determine availability of interface options and capabilities. In some cases, a power mode may be a configurable attribute used to control a power state.

In some examples, the fourth row 425-*a* may include data fields 465, 470, 475, and 480, that indicate various error causes. For example, the data field 465 (TC 1/0 err) may indicate an error with TC1 or TC0 (e.g., a logic 1 for TC1 and a logic 0 for TC0), the data field 470 (AFC 1/0 err) may indicate an error with the AFC transmission or control frame (e.g., a logic 1 for AFC1 and a logic 0 for AFC0), the data field 475 (FLR err) may indicate an error with the filler data, and the data field 480 (Frame number of last good TC1/0 or AFC1/0) may indicate a frame number of (e.g., a frame sequence number) of the last successfully received and decoded TC or AFC. In some cases, the data field 470 may correspond to an error cause associated with the device receiving a first control frame (e.g., AFC0) and a second control frame (e.g., AFC1) within a threshold duration (e.g., within a relatively short amount of time) and generate a NAC frame such that a device 305 receiving the NAC frame may be able to determine which control frame the error condition is associated with (e.g., via a logic 1 or a logic 0 in the data field 470). In some examples, the data field 475 may correspond to an error cause associated with filler data, in which the data payload of the transmitted data frame includes filler data. In some cases, filler data may be dummy data (e.g., random data without meaning).

In some cases, the fifth row 425-*b* may include data fields 485, that indicate various error causes. For example, the data field 485-*a* (PA_INIT) may indicate that the data link layer has issued or received a physical adapter indicator (e.g., a PA_INIT.req or a PA_INIT.ind), the data field 485-*b* (PA_INIT_ERROR) may indicate that the physical adapter initialization request (PA_INIT.req) has failed, the data field 485-*c* (PA_ERROR_IND_RECEIVED) may indicate that a physical adapter error message (PA_ERROR.ind) has been received, the data field 485-*d* (BAD_CTRL_SYMBOL_TYPE) may indicate if an unsupported data or control symbol is received, the data field 485-*e* (FRAME_SYNTAX_ERROR) may indicate that an unexpected framing sequence has been received, the data field 485-*f* (EOF_SYNTAX_ERROR) may indicate that an end of file symbol (e.g., EOF_EVEN or EOF_ODD) without a following single data symbol has been received, the data field 485-*g* (NAC_FRAME_SYNTAX_ERROR) may indicate that a NAC symbol without a following single data symbol has been received, the data field 485-*h* (AFC_FRAME_SYNTAX_ERROR) may indicate that an AFC symbol without a following single data symbol has been received, the data field 485-*i* (WRONG_SEQUENCE_NUMBER) may indicate that a correct frame with a wrong frame sequence number has been received, the data field 485-*j* (MAX_FRAME_LENGTH_EXCEEDED) may indicate that a frame with a payload longer than a threshold value (e.g., DL_MTU) has been received, the data field 485-*k* may indicate (RX_BUFFER_OVERFLOW) may indicate that a receive buffer overflows, the data field 485-1 (CRC ERROR) may indicate that a cyclic redundancy check error has been detected on either a data or a control frame, the data field 485-*n* (FCx_PROTECTION_TIMER_EXPIRED) may indicate that a timer (FCx_PROTECTION_TIMER) has expired, the data field 485-*o* (AFCx_REQUEST_TIMER_EXPIRED) may indicate that a timer (AFCx_REQUEST_TIMER) has expired, the data field 485-*p* (TCx_REPLAY_TIMER_EXPIRED) may indicate that a timer (TCx_REPLAY_TIMER) has expired, and the data field 485-*q* (NAC_RECEIVED) may indicate that a NAC frame has been received.

Figure 5:
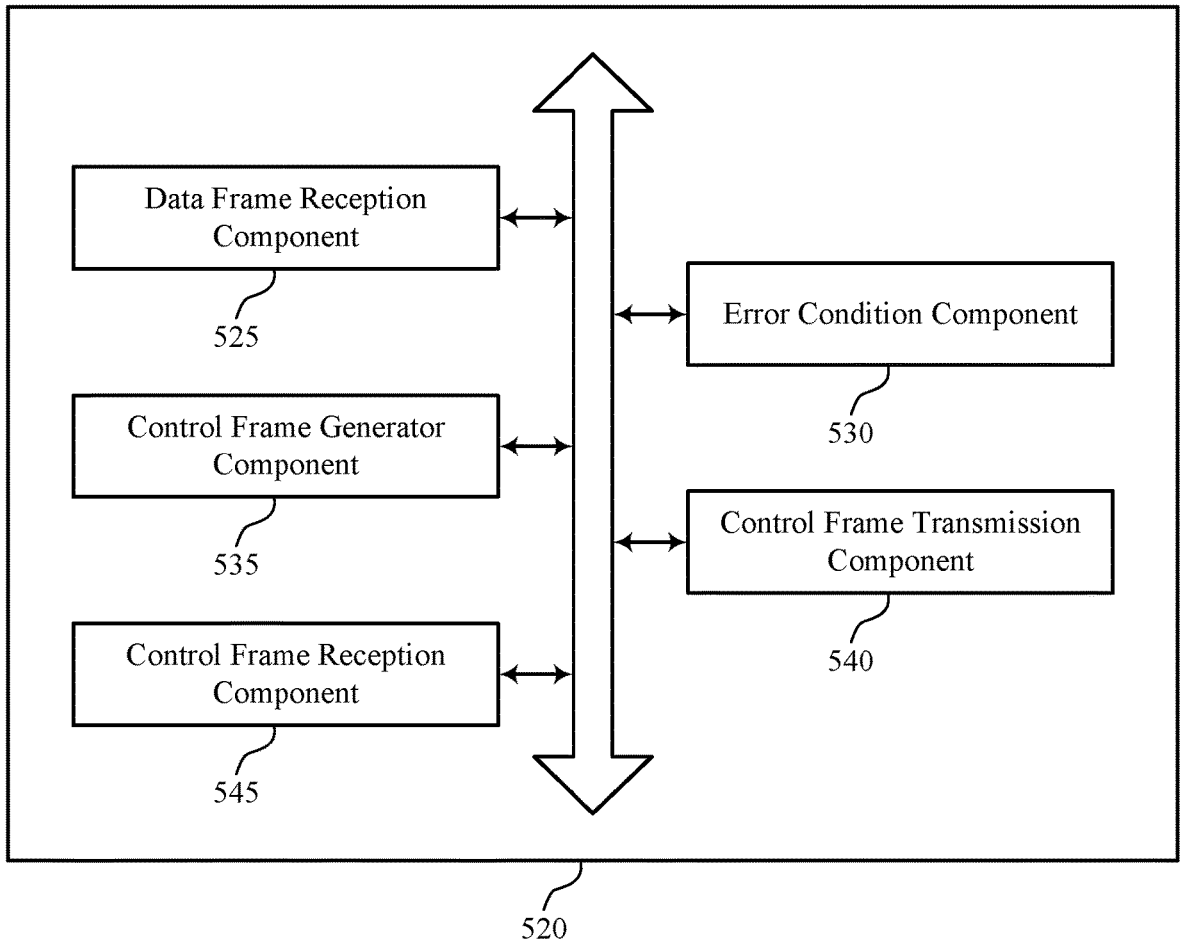
FIG. 5 shows a block diagram of a memory system that supports an enhanced NAC frame in accordance with examples as disclosed herein.

FIG. 5 shows a block diagram 500 of a memory system 520 that supports an enhanced NAC frame in accordance with examples as disclosed herein. The memory system 520 may be an example of aspects of a memory system as described with reference to FIGS. 1 through 4. The memory system 520, or various components thereof, may be an example of means for performing various aspects of operations associated with an enhanced NAC frame as described herein. For example, the memory system 520 may include a data frame reception component 525, an error condition component 530, a control frame generator component 535, a control frame transmission component 540, a control frame reception component 545, or any combination thereof. Each of these components may communicate, directly or indirectly, with one another (e.g., via one or more buses).

The data frame reception component 525 may be configured as or otherwise support a means for receiving a data frame including header information and a data payload based at least in part on a format of the data frame. The error condition component 530 may be configured as or otherwise support a means for determining an error condition associated with a set of layers of a protocol stack based at least in part on the data payload of the data frame. The control frame generator component 535 may be configured as or otherwise support a means for generating a control frame based at least in part on a format of the control frame, the control frame indicating an error cause for the determined error condition associated with the set of layers of the protocol stack. The control frame transmission component 540 may be configured as or otherwise support a means for transmitting the control frame indicating the error cause.

In some examples, the data frame reception component 525 may be configured as or otherwise support a means for receiving a retransmission of the data frame based at least in part on the transmitted control frame. In some examples, the control frame includes a first quantity of bits for indicating an existence of an error and a second quantity of bits for indicating the error cause for the determined error condition associated with the set of layers of the protocol stack. In some examples, the error cause is associated with a first layer of the set of layers of the protocol stack and corresponds to one or more lanes, one or more lines, one or more symbols, or any combination thereof. In some examples, the error cause is associated with a second layer of the set of layers of the protocol stack and corresponds to decoding data, a power mode change request, a power mode change confirmation, an attribute request, an attribute return, setting an attribute, returning an attribute setting result, or any combination thereof. In some examples, the error cause corresponds to a frame number, adapter initialization, an unsupported symbol, an unexpected frame sequence, frame syntax, a sequence number, a threshold frame length, a buffer overflow, a cyclic redundancy check, one or more timers, a frame reception, or any combination thereof.

In some examples, the control frame reception component 545 may be configured as or otherwise support a means for receiving a first control frame and a second control frame within a threshold duration, where the error cause corresponds to receiving the first control frame and the second control frame within the threshold duration. In some examples, the data payload includes filler data and the error cause corresponds to the filler data. In some examples, the set of layers of the protocol stack includes a first layer associated with a physical layer, a second layer associated with a physical adapter layer, and a third layer associated with a data link layer. In some examples, the control frame includes a NAC frame, and the format of the control frame includes a NAC frame format. In some examples, the error cause corresponds to an error associated with acknowledgment and flow control (AFC). In some examples, the protocol stack includes a unified protocol stack (UPS). In some examples, a first device of a memory system or the memory device includes a UFS device. In some examples, the memory device is included in the memory system.

Figure 6:
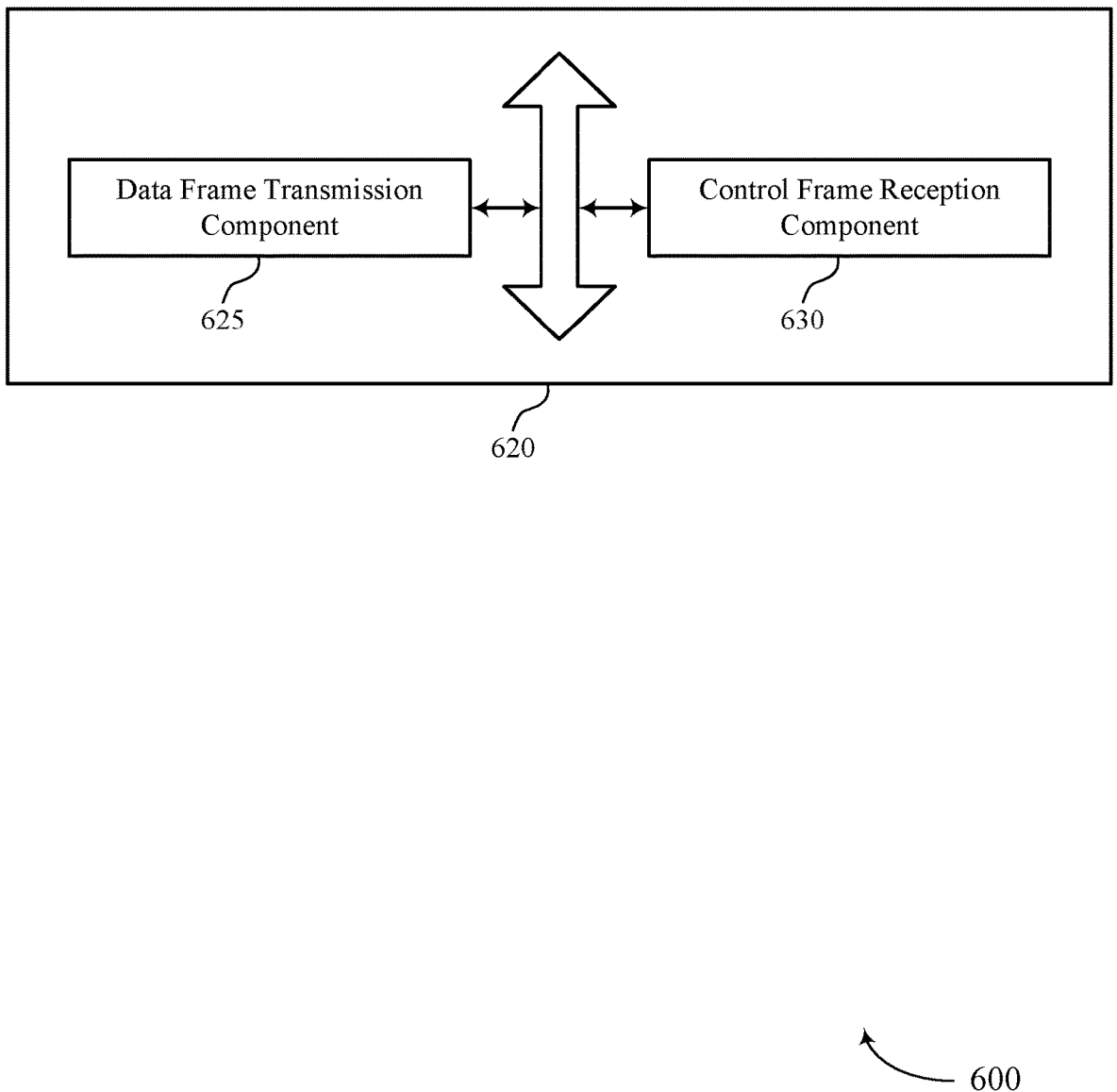
FIG. 6 shows a block diagram of a host system that supports an enhanced NAC frame in accordance with examples as disclosed herein.

FIG. 6 shows a block diagram 600 of a host system 620 that supports an enhanced NAC frame in accordance with examples as disclosed herein. The host system 620 may be an example of aspects of a host system as described with reference to FIGS. 1 through 4. The host system 620, or various components thereof, may be an example of means for performing various aspects of operations associated with an enhanced NAC frame as described herein. For example, the host system 620 may include a data frame transmission component 625 a control frame reception component 630, or any combination thereof. Each of these components may communicate, directly or indirectly, with one another (e.g., via one or more buses).

The data frame transmission component 625 may be configured as or otherwise support a means for transmitting a data frame including header information and a data payload based at least in part on a format of the data frame. The control frame reception component 630 may be configured as or otherwise support a means for receiving a control frame indicating an error cause for an error condition associated with a set of layers of a protocol stack based at least in part on the transmitted data payload of the data frame.

In some examples, the data frame transmission component 625 may be configured as or otherwise support a means for transmitting a retransmission of the data frame based at least in part on the transmitted control frame.

In some examples, the control frame includes a first quantity of bits for indicating an existence of an error and a second quantity of bits for indicating the error cause for the error condition associated with the set of layers of the protocol stack.

In some examples, the error cause is associated with a first layer of the set of layers of the protocol stack and corresponds to one or more lanes, one or more lines, one or more symbols, or any combination thereof.

In some examples, the error cause is associated with a second layer of the set of layers of the protocol stack and corresponds to decoding data, a power mode change request, a power mode change confirmation, an attribute request, an attribute return, setting an attribute, returning an attribute setting result, or any combination thereof.

In some examples, the error cause corresponds to a frame number, adapter initialization, an unsupported symbol, an unexpected frame sequence, frame syntax, a sequence number, a threshold frame length, a buffer overflow, a cyclic redundancy check, one or more timers, a frame reception, or any combination thereof. In some examples, the error cause corresponds to an AFC.

Figure 7:
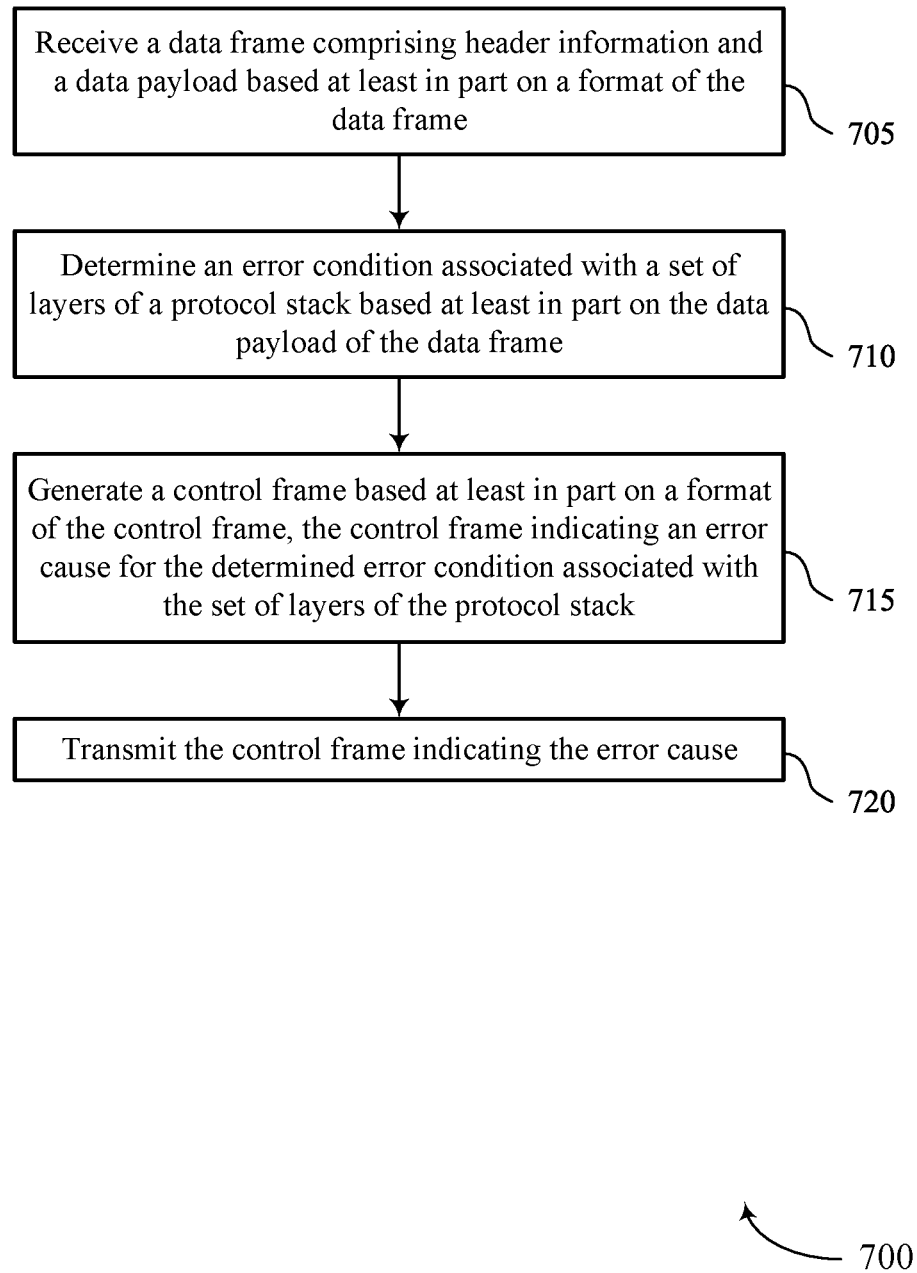
FIGS. 7 and 8 show flowcharts illustrating a method or methods that support an enhanced NAC frame in accordance with examples as disclosed herein.

FIG. 7 shows a flowchart illustrating a method 700 that supports an enhanced NAC frame in accordance with examples as disclosed herein. The operations of method 700 may be implemented by a memory system or its components as described herein. For example, the operations of method 700 may be performed by a memory system as described with reference to FIGS. 1 through 5. In some examples, a memory system may execute a set of instructions to control the functional elements of the device to perform the described functions. Additionally, or alternatively, the memory system may perform aspects of the described functions using special-purpose hardware.

At 705, the method may include receiving a data frame including header information and a data payload based at least in part on a format of the data frame. The operations of 705 may be performed in accordance with examples as disclosed herein. In some examples, aspects of the operations of 705 may be performed by a data frame reception component 525 as described with reference to FIG. 5.

At 710, the method may include determining an error condition associated with a set of layers of a protocol stack based at least in part on the data payload of the data frame. The operations of 710 may be performed in accordance with examples as disclosed herein. In some examples, aspects of the operations of 710 may be performed by an error condition component 530 as described with reference to FIG. 5.

At 715, the method may include generating a control frame based at least in part on a format of the control frame, the control frame indicating an error cause for the determined error condition associated with the set of layers of the protocol stack. The operations of 715 may be performed in accordance with examples as disclosed herein. In some examples, aspects of the operations of 715 may be performed by a control frame generator component 535 as described with reference to FIG. 5.

At 720, the method may include transmitting the control frame indicating the error cause. The operations of 720 may be performed in accordance with examples as disclosed herein. In some examples, aspects of the operations of 720 may be performed by a control frame transmission component 540 as described with reference to FIG. 5.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving a data frame including header information and a data payload based at least in part on a format of the data frame; determining an error condition associated with a set of layers of a protocol stack based at least in part on the data payload of the data frame; generating a control frame based at least in part on a format of the control frame, the control frame indicating an error cause for the determined error condition associated with the set of layers of the protocol stack; and transmitting the control frame indicating the error cause.

Aspect 2: The method, apparatus, or non-transitory computer-readable medium of aspect 1, further including operations, features, circuitry, logic, means, or instructions, or any combination thereof for receiving a retransmission of the data frame based at least in part on the transmitted control frame.

Aspect 3: The method, apparatus, or non-transitory computer-readable medium of any of aspects 1 through 2 where the control frame includes a first quantity of bits for indicating an existence of an error and a second quantity of bits for indicating the error cause for the determined error condition associated with the set of layers of the protocol stack.

Aspect 4: The method, apparatus, or non-transitory computer-readable medium of any of aspects 1 through 3 where the error cause is associated with a first layer of the set of layers of the protocol stack and corresponds to one or more lanes, one or more lines, one or more symbols, or any combination thereof.

Aspect 5: The method, apparatus, or non-transitory computer-readable medium of any of aspects 1 through 4 where the error cause is associated with a second layer of the set of layers of the protocol stack and corresponds to decoding data, a power mode change request, a power mode change confirmation, an attribute request, an attribute return, setting an attribute, returning an attribute setting result, or any combination thereof.

Aspect 6: The method, apparatus, or non-transitory computer-readable medium of any of aspects 1 through 5 where the error cause corresponds to a frame number, adapter initialization, an unsupported symbol, an unexpected frame sequence, frame syntax, a sequence number, a threshold frame length, a buffer overflow, a cyclic redundancy check, one or more timers, a frame reception, or any combination thereof.

Aspect 7: The method, apparatus, or non-transitory computer-readable medium of any of aspects 1 through 6, further including operations, features, circuitry, logic, means, or instructions, or any combination thereof for receiving a first control frame and a second control frame within a threshold duration, where the error cause corresponds to receiving the first control frame and the second control frame within the threshold duration.

Aspect 8: The method, apparatus, or non-transitory computer-readable medium of any of aspects 1 through 7 where the data payload includes filler data and the error cause corresponds to the filler data.

Aspect 9: The method, apparatus, or non-transitory computer-readable medium of any of aspects 1 through 8 where the set of layers of the protocol stack includes a first layer associated with a physical layer, a second layer associated with a physical adapter layer, and a third layer associated with a data link layer.

Aspect 10: The method, apparatus, or non-transitory computer-readable medium of any of aspects 1 through 9 where the control frame includes a NAC frame, and the format of the control frame includes a NAC frame format.

Aspect 11: The method, apparatus, or non-transitory computer-readable medium of any of aspects 1 through 10 where the error cause corresponds to an error associated with AFC.

Aspect 12: The method, apparatus, or non-transitory computer-readable medium of any of aspects 1 through 11 where the protocol stack includes a unified protocol stack.

Aspect 13: The method, apparatus, or non-transitory computer-readable medium of any of aspects 1 through 12 where a first device of a memory system or the memory device includes a UFS device and the memory device is included in the memory system.

Figure 8:
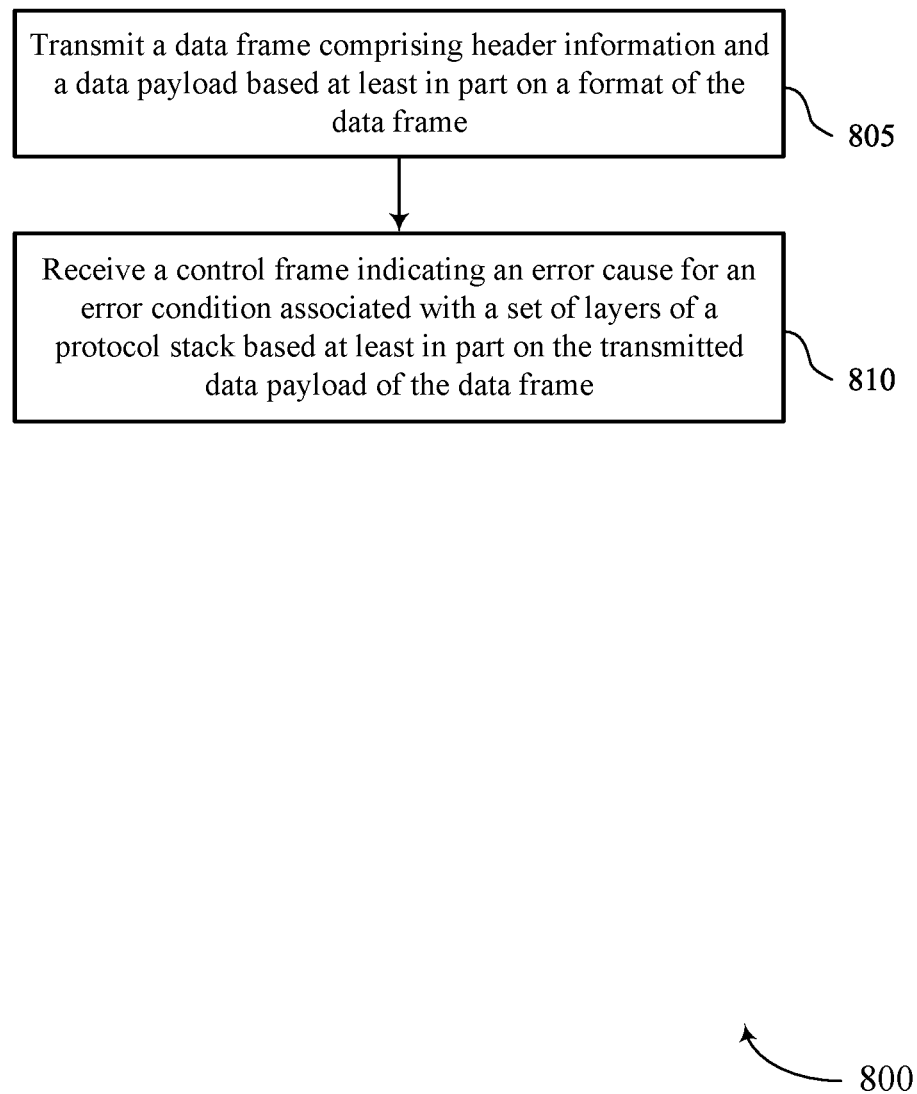

FIG. 8 shows a flowchart illustrating a method 800 that supports an enhanced NAC frame in accordance with examples as disclosed herein. The operations of method 800 may be implemented by a host system or its components as described herein. For example, the operations of method 800 may be performed by a host system as described with reference to FIGS. 1 through 4 and 6. In some examples, a host system may execute a set of instructions to control the functional elements of the device to perform the described functions. Additionally, or alternatively, the host system may perform aspects of the described functions using special-purpose hardware.

At 805, the method may include transmitting a data frame including header information and a data payload based at least in part on a format of the data frame. The operations of 805 may be performed in accordance with examples as disclosed herein. In some examples, aspects of the operations of 805 may be performed by a data frame transmission component 625 as described with reference to FIG. 6.

At 810, the method may include receiving a control frame indicating an error cause for an error condition associated with a set of layers of a protocol stack based at least in part on the transmitted data payload of the data frame. The operations of 810 may be performed in accordance with examples as disclosed herein. In some examples, aspects of the operations of 810 may be performed by a control frame reception component 630 as described with reference to FIG. 6.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 14: A method, apparatus, or non-transitory computer-readable medium including operations, features, circuitry, logic, means, or instructions, or any combination thereof for transmitting a data frame including header information and a data payload based at least in part on a format of the data frame and receiving a control frame indicating an error cause for an error condition associated with a set of layers of a protocol stack based at least in part on the transmitted data payload of the data frame.

Aspect 15: The method, apparatus, or non-transitory computer-readable medium of aspect 14, further including operations, features, circuitry, logic, means, or instructions, or any combination thereof for transmitting a retransmission of the data frame based at least in part on the transmitted control frame.

Aspect 16: The method, apparatus, or non-transitory computer-readable medium of any of aspects 14 through 15 where the control frame includes a first quantity of bits for indicating an existence of an error and a second quantity of bits for indicating the error cause for the error condition associated with the set of layers of the protocol stack.

Aspect 17: The method, apparatus, or non-transitory computer-readable medium of any of aspects 14 through 16 where the error cause is associated with a first layer of the set of layers of the protocol stack and corresponds to one or more lanes, one or more lines, one or more symbols, or any combination thereof.

Aspect 18: The method, apparatus, or non-transitory computer-readable medium of any of aspects 14 through 17 where the error cause is associated with a second layer of the set of layers of the protocol stack and corresponds to decoding data, a power mode change request, a power mode change confirmation, an attribute request, an attribute return, setting an attribute, returning an attribute setting result, or any combination thereof.

Aspect 19: The method, apparatus, or non-transitory computer-readable medium of any of aspects 14 through 18 where the error cause corresponds to a frame number, adapter initialization, an unsupported symbol, an unexpected frame sequence, frame syntax, a sequence number, a threshold frame length, a buffer overflow, a cyclic redundancy check, one or more timers, a frame reception, or any combination thereof.

Aspect 20: The method, apparatus, or non-transitory computer-readable medium of any of aspects 14 through 19 where the error cause corresponds to an AFC.

It should be noted that the described techniques include possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 21: An apparatus, including: a memory device; and a controller configured to couple with the memory device and configured to cause the apparatus to: receive a data frame including header information and a data payload based at least in part on a format of the data frame; determine an error condition associated with a set of layers of a protocol stack based at least in part on the data payload of the data frame; generate a control frame based at least in part on a format of the control frame, the control frame indicating an error cause for the determined error condition associated with the set of layers of the protocol stack; and transmit the control frame indicating the error cause.

Aspect 22: The apparatus of aspect 21, where the controller is further configured to cause the apparatus to: receive a retransmission of the data frame based at least in part on the transmitted control frame.

Aspect 23: The apparatus of any of aspects 21 through 22, where the control frame includes a first quantity of bits for indicating an existence of an error and a second quantity of bits for indicating the error cause for the determined error condition associated with the set of layers of the protocol stack.

Aspect 24: The apparatus of any of aspects 21 through 23, where the error cause is associated with a first layer of the set of layers of the protocol stack and corresponds to one or more lanes, one or more lines, one or more symbols, or any combination thereof.

Aspect 25: The apparatus of any of aspects 21 through 24, where the error cause is associated with a second layer of the set of layers of the protocol stack and corresponds to decoding data, a power mode change request, a power mode change confirmation, an attribute request, an attribute return, setting an attribute, returning an attribute setting result, or any combination thereof.

Aspect 26: The apparatus of any of aspects 21 through 25, where the error cause corresponds to a frame number, adapter initialization, an unsupported symbol, an unexpected frame sequence, frame syntax, a sequence number, a threshold frame length, a buffer overflow, a cyclic redundancy check, one or more timers, a frame reception, or any combination thereof.

Aspect 27: The apparatus of any of aspects 21 through 26, where the controller is further configured to cause the apparatus to: receive a first control frame and a second control frame within a threshold duration, where the error cause corresponds to receiving the first control frame and the second control frame within the threshold duration.

Aspect 28: The apparatus of any of aspects 21 through 27, where the data payload includes filler data and the error cause corresponds to the filler data.

Aspect 29: The apparatus of any of aspects 21 through 28, where the set of layers of the protocol stack includes a first layer associated with a physical layer, a second layer associated with a physical adapter layer, and a third layer associated with a data link layer.

Aspect 30: The apparatus of any of aspects 21 through 29, where the control frame includes a NAC frame, and the format of the control frame includes a NAC frame format.

Aspect 31: The apparatus of any of aspects 21 through 30, where the error cause corresponds to an error associated with AFC.

Aspect 32: The apparatus of any of aspects 21 through 31, where the protocol stack includes a unified protocol stack.

Aspect 33: The apparatus of any of aspects 21 through 32, where a first device of a memory system or the memory device includes a UFS device, the memory device is included in the memory system.

An apparatus is described. The following provides an overview of aspects of the apparatus as described herein:

Aspect 34: An apparatus, including: a controller configured to couple with a memory system, the controller configured to cause the apparatus to: transmit a data frame including header information and a data payload based at least in part on a format of the data frame; receive a control frame indicating an error cause for an error condition associated with a set of layers of a protocol stack based at least in part on the transmitted data payload of the data frame; and transmit a retransmission of the data frame based at least in part on the transmitted control frame.

Aspect 35: The apparatus of aspect 34, where the controller is further configured to cause the apparatus to: transmit a retransmission of the data frame based at least in part on the transmitted control frame.

Aspect 36: The apparatus of any of aspects 34 through 35, where the control frame includes a first quantity of bits for indicating an existence of an error and a second quantity of bits for indicating the error cause for the error condition associated with the set of layers of the protocol stack.

Aspect 37: The apparatus of any of aspects 34 through 36, where the error cause is associated with a first layer of the set of layers of the protocol stack and corresponds to one or more lanes, one or more lines, one or more symbols, or any combination thereof.

Aspect 38: The apparatus of any of aspects 34 through 37, where the error cause is associated with a second layer of the set of layers of the protocol stack and corresponds to decoding data, a power mode change request, a power mode change confirmation, an attribute request, an attribute return, setting an attribute, returning an attribute setting result, or any combination thereof.

Aspect 39: The apparatus of any of aspects 34 through 38, where the error cause corresponds to a frame number, adapter initialization, an unsupported symbol, an unexpected frame sequence, frame syntax, a sequence number, a threshold frame length, a buffer overflow, a cyclic redundancy check, one or more timers, a frame reception, or any combination thereof.

Aspect 40: The apparatus of any of aspects 34 through 39, where the error cause corresponds to an AFC.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and includes a three terminal device including a source, drain, and gate. The terminals may be connected to other electronic elements through conductive materials, such as, metals. The source and drain may be conductive and may include a heavily-doped, for example, degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
   one or more memory devices; and
   processing circuitry configured to couple with the one or more memory devices and configured to cause the memory system to:
   receive a data frame comprising header information and a data payload based at least in part on a format of the data frame;
   determine an error condition associated with a set of layers of a protocol stack based at least in part on the data payload of the data frame;
   generate a control frame based at least in part on a format of the control frame, the control frame indicating an error cause for the determined error condition associated with the set of layers of the protocol stack, wherein the error cause is associated with a quantity of fields in one or more rows of the control frame; and
   transmit the control frame indicating the error cause.

2. The memory system of claim 1, wherein the processing circuitry is further configured to cause the memory system to:
   receive a retransmission of the data frame based at least in part on the transmitted control frame.

3. The memory system of claim 1, wherein the control frame comprises a first quantity of bits for indicating an existence of an error and a second quantity of bits for indicating the error cause for the determined error condition associated with the set of layers of the protocol stack.

4. The memory system of claim 1, wherein the error cause is associated with a first layer of the set of layers of the protocol stack and corresponds to one or more lanes, one or more lines, one or more symbols, or any combination thereof.

5. The memory system of claim 1, wherein the error cause is associated with a second layer of the set of layers of the protocol stack and corresponds to decoding data, a power mode change request, a power mode change confirmation, an attribute request, an attribute return, setting an attribute, returning an attribute setting result, or any combination thereof.

6. The memory system of claim 1, wherein the error cause corresponds to a frame number, adapter initialization, an unsupported symbol, an unexpected frame sequence, frame syntax, a sequence number, a threshold frame length, a buffer overflow, a cyclic redundancy check, one or more timers, a frame reception, or any combination thereof.

7. The memory system of claim 1, wherein the processing circuitry is further configured to cause the memory system to:
   receive a first control frame and a second control frame within a threshold duration, wherein the error cause corresponds to receiving the first control frame and the second control frame within the threshold duration.

8. The memory system of claim 1, wherein the data payload comprises filler data and the error cause corresponds to the filler data.

9. The memory system of claim 1, wherein the set of layers of the protocol stack comprises a first layer associated with a physical layer, a second layer associated with a physical adapter layer, and a third layer associated with a data link layer.

10. The memory system of claim 1, wherein the control frame comprises a negative acknowledgment control frame, and the format of the control frame comprises a negative acknowledgment control frame format.

11. The memory system of claim 1, wherein the error cause corresponds to an error associated with acknowledgment and flow control (AFC).

12. The memory system of claim 1, wherein the protocol stack comprises a unified protocol stack.

13. The memory system of claim 1, wherein a first device of the memory system or the one or more memory devices comprises a universal flash storage (UFS) device, and the one or more memory devices is included in the memory system.

14. A memory system, comprising:
   processing circuitry configured to couple with the memory system, the processing circuitry configured to cause the memory system to:

transmit a data frame comprising header information and a data payload based at least in part on a format of the data frame; and receive a control frame indicating an error cause for an error condition associated with a set of layers of a protocol stack based at least in part on the transmitted data payload of the data frame, wherein the error cause is associated with a quantity of fields in one or more rows of the control frame.

15. The memory system of claim 14, wherein the processing circuitry is further configured to cause the memory system to:

transmit a retransmission of the data frame based at least in part on the transmitted control frame.

16. The memory system of claim 14, wherein the control frame comprises a first quantity of bits for indicating an existence of an error and a second quantity of bits for indicating the error cause for the error condition associated with the set of layers of the protocol stack.

17. The memory system of claim 14, wherein the error cause is associated with a first layer of the set of layers of the protocol stack and corresponds to one or more lanes, one or more lines, one or more symbols, or any combination thereof.

18. The memory system of claim 14, wherein the error cause is associated with a second layer of the set of layers of the protocol stack and corresponds to decoding data, a power mode change request, a power mode change confirmation, an attribute request, an attribute return, setting an attribute, returning an attribute setting result, or any combination thereof.

19. The memory system of claim 14, wherein the error cause corresponds to a frame number, adapter initialization, an unsupported symbol, an unexpected frame sequence, frame syntax, a sequence number, a threshold frame length, a buffer overflow, a cyclic redundancy check, one or more timers, a frame reception, or any combination thereof.

20. The memory system of claim 14, wherein the error cause corresponds to an acknowledgment and flow control (AFC).

21. A method, comprising:

receiving a data frame comprising header information and a data payload based at least in part on a format of the data frame;

determining an error condition associated with a set of layers of a protocol stack based at least in part on the data payload of the data frame;

generating a control frame based at least in part on a format of the control frame, the control frame indicating an error cause for the determined error condition associated with the set of layers of the protocol stack, wherein the error cause is associated with a quantity of fields in one or more rows of the control frame; and transmitting the control frame indicating the error cause.

22. The method of claim 21, further comprising:

receiving a retransmission of the data frame based at least in part on the transmitted control frame.

23. The method of claim 21, wherein the control frame comprises a first quantity of bits for indicating an existence of an error and a second quantity of bits for indicating the error cause for the determined error condition associated with the set of layers of the protocol stack.

24. The method of claim 21, wherein the error cause is associated with a first layer of the set of layers of the protocol stack and corresponds to one or more lanes, one or more lines, one or more symbols, or any combination thereof.

25. The method of claim 21, wherein the error cause is associated with a second layer of the set of layers of the protocol stack and corresponds to decoding data, a power mode change request, a power mode change confirmation, an attribute request, an attribute return, setting an attribute, returning an attribute setting result, or any combination thereof.

* * * * *